(12) United States Patent
Cobden et al.

(10) Patent No.: US 9,056,306 B2
(45) Date of Patent: Jun. 16, 2015

(54) REGENERATION OF GAS ADSORBENTS

(75) Inventors: Paul Dean Cobden, Petten (NL); Hendricus Adrianus Johannes Van Dijk, Petten (NL); Stéphane Walspurger, Petten (NL)

(73) Assignee: Stichting Energieonderzoek Centrum Nederland, Petten (NL)

( * ) Notice: Subject to any disclaimer, the term of this patent is extended or adjusted under 35 U.S.C. 154(b) by 0 days.

(21) Appl. No.: 14/236,314

(22) PCT Filed: Aug. 3, 2012

(86) PCT No.: PCT/NL2012/050547
§ 371 (c)(1),
(2), (4) Date: Jan. 30, 2014

(87) PCT Pub. No.: WO2013/019116
PCT Pub. Date: Feb. 7, 2013

(65) Prior Publication Data
US 2014/0213430 A1 Jul. 31, 2014

(30) Foreign Application Priority Data

Aug. 3, 2011 (NL) .................................. 2007218

(51) Int. Cl.
| | |
|---|---|
| *B01J 38/06* | (2006.01) |
| *B01J 20/34* | (2006.01) |
| *B01D 53/04* | (2006.01) |
| *C01B 3/52* | (2006.01) |
| *C01B 3/24* | (2006.01) |
| *C01B 3/56* | (2006.01) |
| *C01B 3/02* | (2006.01) |

(52) U.S. Cl.
CPC ............. *B01J 20/3466* (2013.01); *B01D 53/04* (2013.01); *C01B 3/52* (2013.01); *B01D 2256/16* (2013.01); *B01D 2257/304* (2013.01); *B01D 2257/504* (2013.01); *B01D 2258/05* (2013.01); *B01D 2259/40086* (2013.01); *B01D 2259/401* (2013.01); *Y02C 10/08* (2013.01); *C01B 3/24* (2013.01); *C01B 3/56* (2013.01); *C01B 3/02* (2013.01)

(58) Field of Classification Search
CPC ...................................................... B01J 38/06
USPC ...................................... 502/55, 34, 514, 515
See application file for complete search history.

(56) References Cited

U.S. PATENT DOCUMENTS

| | | | |
|---|---|---|---|
| 4,813,980 | A | 3/1989 | Sircar |
| 6,322,612 | B1 | 11/2001 | Sircar et al. |

FOREIGN PATENT DOCUMENTS

| | | |
|---|---|---|
| EP | 0 620 035 A1 | 10/1994 |
| WO | WO 2010/059052 A1 | 5/2010 |

OTHER PUBLICATIONS

International Search Report of PCT/NL2012/050547 mailed Nov. 6, 2012.

*Primary Examiner* — Edward Johnson
(74) *Attorney, Agent, or Firm* — Gilberto M. Villacorta; Sunit Talapatra; Foley & Lardner LLP

(57) ABSTRACT

Two or more acidic gaseous species such as hydrogen sulphide and carbon dioxide from an adsorbent can be selectively removed from a feed gas by contacting the feed gas with an adsorbent for these acidic species, followed by: a. subjecting the adsorbent to a first purging gas, said first purging gas not containing said first acidic gaseous species and containing said second acidic gaseous species at a partial pressure which is at least the partial pressure of said second gaseous species in said feed gas; b. subsequently subjecting the adsorbent to a second purging gas, said second purging gas not containing said first gaseous species and, containing this second gaseous species at a partial pressure which is lower than the partial pressure of said second gaseous species in said feed gas.

20 Claims, 5 Drawing Sheets

REGENERATION OF GAS ADSORBENTS

CROSS-REFERENCE TO RELATED APPLICATION(S)

This application is the National Phase of International Patent Application no. PCT/NL2012/050547, filed Aug. 3, 2012, published as WO 2013/019116, which claims priority to Netherlands Application No. 2007218, filed Aug. 3, 2011. The contents of these applications are herein incorporated by reference in their entirety.

FIELD OF THE INVENTION

The invention is in the field of removal of acidic gases by adsorption, for example in water gas shift (WGS) processes. The invention relates in particular to the selective desorption of adsorbed acidic gases from adsorbents used in such processes.

BACKGROUND OF THE INVENTION

U.S. Pat. No. 6,322,612 (Air Products) describes a pressure or vacuum swing adsorption process and apparatus used for the separation and recovery of certain gaseous components, such as carbon dioxide from hot gas mixtures containing water vapour. The process comprises reacting the feed gas mixture at a temperature of between 150 and 450° C. in an adsorber column containing an adsorbent. The adsorbent can be sodium-promoted alumina or potassium-promoted hydrotalcite and adsorbs the carbon dioxide. The adsorbent is regenerated by depressurising and then purging the absorber column with steam to withdraw an effluent comprising a mixture of carbon dioxide and possible further adsorbable components, and $H_2O$. Next, the adsorber column is pressurized by introducing a gas that is depleted of carbon dioxide. The steps are repeated in a cyclic manner.

WO 2010/059052 describes a sorption-enhanced water gas shift (SEWGS) process to produce hydrogen and carbon dioxide as well as hydrogen sulphide, wherein the carbon dioxide and hydrogen sulphide are adsorbed onto an alkali promoted hydrotalcite adsorbent. The carbon dioxide and hydrogen sulphide are subsequently simultaneously removed from the adsorbent.

In these and other prior art processes using acidic adsorbents, acidic gaseous components such as carbon dioxide, hydrogen sulphide and the like end up in the same product (or effluent) stream, which make reuse or purification of these streams difficult. The problem to be solved by the invention is a stepwise and selective removal of gaseous acidic species for adsorbents used for producing desirable-especially hydrogen-containing-gas mixtures.

SUMMARY OF THE INVENTION

The invention pertains to a process for selectively removing acidic gaseous components, in particular carbon dioxide ($CO_2$) and hydrogen sulphide ($H_2S$), from an adsorbent which has adsorbed the gaseous components as a result from contacting the adsorbent with a feed gas containing these acidic gaseous species. The process of the invention leads to a desired gas from which the gaseous components have been removed to a high degree. In addition, the process allows a separate processing, and if required utilisation, of the acidic components in subsequent steps. Furthermore, the process of the invention leads to distinct mass-transfer zones for the acid components $CO_2$ and $H_2S$ during the subsequent feeding phase of the cyclic process, where the $H_2S$ mass transfer zone is located upstream that of $CO_2$. This allows enhanced removal of $H_2S$ and higher process efficiency.

DETAILED DESCRIPTION OF THE INVENTION

The invention relates to a process for selectively removing a first acidic gaseous species and a second acidic gaseous species from an adsorbent which has been contacted with a feed gas loaded containing said first and second gaseous species, comprising the steps of:

(a) subjecting the adsorbent to a first purging gas, said first purging gas not containing said first acidic gaseous species and containing said second acidic gaseous species at a partial pressure which is at least the partial pressure of said second gaseous species in said feed gas;

(b) subsequently subjecting the adsorbent to a second purging gas, said second purging gas not containing said first gaseous species and, if containing said second gaseous species, containing this second gaseous species at a partial pressure which is lower than the partial pressure of said second gaseous species in said feed gas.

The invention furthermore relates to a process for producing a desired gas, such as a hydrogen-containing gas, by reacting a feed gas to produce said desired gas as well as two or more gaseous acidic species, wherein the feed gas is reacted in the presence of an adsorbent capable of adsorbing two or more of said acidic gaseous species, and subsequently removing said two or more of said acidic gaseous species from said adsorbent. For this removal of the acidic components, the process as defined above is used. The process is described in more detail below.

The first and second and optional further acidic gaseous species include and can be selected from carbon dioxide, carbon monoxide, sulphur oxides, nitrogen oxides, hydrogen sulphide, hydrogen chloride (hydrochloric acid) and other hydrogen halides, hydrogen cyanide, and the like. Carbonyl sulphide (COS) and carbon disulphide ($CS_2$), which can be converted to $H_2S$ under condition of adsorption and/or desorption, are considered as equivalents of $H_2S$ and are therefore also included in the term 'acidic gaseous species'. Also, halides such as chlorine ($Cl_2$) and bromine, as well as oxygen ($O_2$) and water ($H_2O$) can be considered and treated as acidic species for the purpose of the invention.

In a particularly useful embodiment of the invention, the first acidic gaseous species comprises hydrogen sulphide ($H_2S$) and the second acidic gaseous species comprises carbon dioxide ($CO_2$). It was found that the adsorption of $H_2S$, when performed by carrying the feed gas through a container, such as a packed bed reactor, containing the adsorbent, predominantly takes place in the upstream portion of the container, which allows a more effective removal of $H_2S$ which can be performed specifically in this upstream portion. This is particularly beneficial when performing the desorption step in counter-current mode. An example where such effective removal of $H_2S$ may be useful, is when complete removal of $H_2S$ and only partial removal of CO and/or $CO_2$ from a feed gas, such as syngas originating from biomass gasification, is desired for further use in the production of fuel or chemicals.

Thus, the feed gas from which the two or more acidic components are adsorbed can be any gas containing two or more acidic gaseous components at any level. For example, hydrogen sulphide (or its equivalents COS and $CS_2$) may be present at levels ranging from 10 ppm to 5 vol. % (50,000 ppm), in particular 50 ppm to 10,000 ppm (1 vol. %), more in particular from 100 to 5000 ppm, especially from 200 to 2000 ppm. Similar levels may apply to hydrogen chloride, hydrogen fluoride, hydrogen bromide, hydrogen cyanide, nitrogen oxides, sulphur oxides, halogens, water and oxygen. Carbon dioxide may also be present at these levels, but also at higher levels up to e.g. 50 vol. %. Carbon dioxide levels may thus be from 10 up or even from 1000 ppm up to 50 vol. %, in particular from 5,000 ppm (0.5 vol. %) to 30 vol. %. In addition to the acidic species, further, non acidic, components may be present, including hydrogen (e.g. 0.5 to 50 vol. %), carbon monoxide, e.g. 1 to 50 vol. %, water (steam, e.g. 2 to 50 vol. %), as well as any amount of inert gaseous species such as nitrogen, air, noble gases (argon, helium etc.). The volume ratio of $H_2O$ to CO of the feed will typically be at least 1.5, preferably at least 2.0.

The first purging gas shall be depleted in the first acidic gaseous component (acidic species), so as to allow an effective desorption of the first acidic component from the adsorbent. Typically, the first acidic species will be hydrogen sulphide, and in those cases the first purging gas should be depleted or substantially free of $H_2S$. This means that the partial pressure of $H_2S$ will be less than half the partial pressure of $H_2S$ in the feed gas, preferably less than 10%, most preferably less than 1% thereof. In absolute terms this may mean a level of less than 50 ppm, preferably less than 10 ppm, in particular less than 2 ppm of $H_2S$. The specific upper limit is determined by levels present in the feed gas and by the purity requirements of the desired gas fractions.

On the other hand, the first purging gas should contain a sufficient level of the second acidic component so as to prevent substantial desorption of the second acidic component a this stage, and thus to allow a separate selective desorption. In particular the partial pressure of the second acidic component in the first purging gas should preferably at least be as high as the partial pressure of this second acidic component in the feed gas, more preferably at least 50% higher. For example, when the second acidic gas is $CO_2$, and the feed gas contains 20% (by vol.) of $CO_2$, the first purging gas should contain at least 20%, preferably at least 30% of $CO_2$, if the two gases are used at the same pressure. If the feed gas contains 20% of $CO_2$ and is applied at a pressure of e.g. 20 bar, and the purging gas is applied at a pressure of 10 bar, the first purging gas should contain at least 40%, preferably at least 60% of $CO_2$. The remainder of the purging gas preferably consists of other, in particular non-acidic gases, especially nitrogen, water (steam) or methane.

Before carrying out the first purging step (a), it is advantageous to apply a rinsing step which ensures that the gas issuing from the first purging (desorption) step does not contain appreciable amounts of non-adsorbed desired components. In such a rinsing step, the adsorbent is contacted with a rinsing gas, which does not contain the first acidic component (for example $H_2S$), and preferably does not contain high levels of the second acidic component. In particular, the second acidic gaseous species (for example $CO_2$) is present at a partial pressure which is lower than the partial pressure of this second gaseous species in the feed gas. Preferably, the rinsing gas is steam or nitrogen or a combination thereof, which may contain low levels of $CO_2$. The absolute pressure applied in the rising step is preferably the same as the absolute pressure of the adsorption step, or a lower pressure.

After the first purging step, the adsorbent is subsequently subjected to a second purging gas. The composition of the second purging gas is less critical than that of the first purging gas. However, it is preferred that the second purging gas does not contain appreciable levels of the first and second gaseous species, in particular $H_2S$ and $CO_2$. Thus, the level of the first acidic species ($H_2S$) is preferably less than 10% of the level in the feed gas, and/or preferably less than 50 ppm, especially less than 10 ppm. The level of second acidic species ($CO_2$) is preferably lower than the partial pressure of $CO_2$ in the feed gas and less than half the level of $CO_2$ in the first purging gas. Alternatively, or in addition, the level of the second acidic species is preferably less than 2 vol. %, more preferably leas then 0.5 vol. %, most preferably less than 0.1 vol. % (1000 ppm). The second purging gas preferably consists predominantly of water (steam) and/or nitrogen. In case the second acidic component is carbon dioxide, the second purging gas is preferably steam, i.e. at least 25 vol. %, preferably at least 50 vol. %, the remainder, if any, being non-acidic gases such as nitrogen, air, argon or the like.

The process of the invention can be used to remove acidic components from various gas mixtures, especially hydrogen-containing gas mixtures. Examples include various forms of synthesis gas ("syngas"), such as biomass-derived syngas (low $H_2S$), coal-derived syngas (medium $H_2S$), petcoke derived syngas (medium $H_2S$), water gas (mainly $H_2$ and CO), shifted water gas (mainly $H_2O$, $H_2$ and $CO_2$), steam reforming gas (also mainly $H_2$ and CO), which may all contain varying levels of $H_2O$, $CO_2$ and nitrogen, and minor amounts of other components such as hydrocarbons (e.g. $CH_4$), oxygen, $H_2S$, COS (carbonyl sulphide), HCN etc. Further example include Claus (Plant) Off gas (CPO gas, also referred to as Claus tail gas), (high $H_2S$, low $CO_2$), in particular CPO gas that has been subjected to a Reducing Gas Generator (RGG) gas, most particularly CPO gas that has been subjected to an RGG and a hydrolysis-hydrogenation unit. Removal of carbon dioxide from water-shift gas mixture and its cost implications are described in Wright et al. *Energy Procedia* 1 (2009), 707-714, as well as in WO 2010/059052.

A further example of gases from which acidic components can be adsorbed and selectively desorbed includes a halogen production process involving conversion of HCl with oxygen to produce chlorine ($Cl_2$) and water, wherein loosely adsorbed components such as HCl or oxygen are first desorbed using a first purging gas comprising chlorine or, preferably, steam, and then more strongly adsorbed components such as $H_2O$ are desorbed preferably using oxygen, air or inert gas, such as $N_2$, preferably at a lower pressure as described herein.

Further processes where one of the products of a chemical reaction is steam are also part of the present invention. Such processes include the following dehydration processes:
production of dimethyl ether from methanol or alternatively the production of other ethers from the corresponding alcohols,
production of esters from carboxylic acids and alcohols,
production of urea from $CO_2$ and $NH_3$,
production of methanol from syngas mixtures,
production of hydrocarbons, such as methane, paraffins and olefins, from syngas mixtures.

In all such processes, the weakly adsorbing components are first desorbed with a first purging gas, preferably comprising steam, and then more strongly adsorbed components such as $H_2O$ are desorbed preferably using oxygen, air or inert gas such as nitrogen, preferably at a lower pressure (pressure swing adsorption, PSA) as described herein.

Specific embodiments of the process of the invention include the removal of CO, $CO_2$ and/or $H_2S$ from syngas (general), biomass-derived syngas, coal derived syngas and Claus off-gases, having the compositions in vol % as given in Table 1. Herein "inert" gases comprise nitrogen, noble gases and the like; $H_2S$ includes COS and $CS_2$.

TABLE 1

|  | $H_2$ | CO | $CO_2$ | $H_2O$ | $CH_4$ | inert | $H_2S$ |
|---|---|---|---|---|---|---|---|
| Syngas general | 25-45 | 20-60 | 5-25 | 2-30 | 0-15 | 0.5-5 | 0.01-1 |
| Bio-mass-derived | 30-45 | 20-30 | 15-25 | 2-10 | 5-15 | 2-5 | 0.002-0.05 |
| Coal-derived | 25-30 | 30-60 | 5-15 | 2-30 | 0-5 | 0.5-5 | 0.2-1 |
| Claus off-gas | 0.2-5# | 0-1 | 1-10 | 15-50 | 0-1 | 40-75 | 0.5-5# |

These values may differ, depending on whether the Claus gas has been subjected to RGG and/or hydrogenation-hydrolysis In a preferred embodiment of the invention, the feed gas comprises carbon monoxide and water, such as feed gas for the water gas shift (WGS) reaction ($CO+H_2O \rightarrow CO_2+H_2$). In particular, the water concentration of the feed gas for a WGS process will be at least 50% higher than the carbon monoxide concentration of the feed gas. Preferably, the feed contains 2-50 vol. %, preferably 4-30 vol. % of CO, 10-60 vol. %, preferably 15-50 vol. % of $H_2O$, 1-30 vol. % of $CO_2$, 1-40 vol. % of $H_2$ and minor components, as well as optional inert gases like nitrogen, argon or other noble gases, hydrocarbons such as $CH_4$. The level of hydrogen sulphide ($H_2S$) is in particular at least 50 ppm, more in particular at least 200 ppm, up to. e.g. 100,000 ppm (10 vol. %), preferably up to 20,000 ppm (2 vol. %). The lower levels apply to e.g. biomass-derived syngas, while the higher levels apply to coal-derived and petcoke-derived syngas and to Claus off-gas. Carbonyl sulphide may also be present and it may be converted to $H_2S$, e.g. when using certain adsorbents such as hydrotalcite-based materials; therefore its level is considered equivalent, on a molar basis, with $H_2S$, meaning that where reference is made herein to hydrogen sulphide ($H_2S$), the combination of $H_2S$ and COS is meant.

When syngas types are used as a feed gas for a WGS, reaction, the $H_2O$ level thereof may therefore have to be adjusted so as to attain the preferred $H_2O$/CO ratios. On the other hand, Claus off-gas may subjected to RGG and/or hydrolysis-hydrogenation, and/or may be admixed with a CO-rich gas, to arrive at a preferred $H_2O$/CO ratio. Table 2 presents adjusted examples of suitable gas compositions which may be used as a feed gas for a WGS process according to the invention.

TABLE 2

|  | $H_2$ | CO | $CO_2$ | $H_2O$ | $CH_4$ | inert | $H_2S$ |
|---|---|---|---|---|---|---|---|
| From syngas general | 17-35 | 15-40 | 4-20 | 23-65 | 0-10 | 0.4-4 | 0.01-0.8 |
| From biomass-derived | 22-35 | 15-25 | 10-20 | 23-50 | 4-13 | 1.5-5 | 0.002-0.04 |
| From coal-derived | 17-25 | 20-40 | 4-12 | 30-65 | 0-4 | 0.3-5 | 0.15-1 |

The process of the invention is especially suitable for carrying out a water-gas shift reaction which is enhanced by a catalyst or a catalytically enhancing adsorbent. Such a process is commonly referred as a sorption enhanced water gas shift (SEWGS) process. Therein, the level of acidic components, especially the level of $CO_2$ and $H_2S$ is low in the product gas ("desired gas") compared to the feed, gas, but also the level of the desired gas, $H_2$, is enhanced compared to the feed gas, at the expense of carbon monoxide and water.

In preferred embodiments, the desired gas comprises hydrogen and the hydrogen concentration of the desired gas is higher than the hydrogen concentration of the feed gas. Similarly, the level of CO and $CO_2$ in the desired gas is lower than their levels in the feed gas.

A preferred feed gas for the process of the invention is a gas mixture issuing from a preceding high temperature water gas shift reaction, which feed gas contains 1-10%, especially 2-6% CO, 5-20%, especially 8-16% $CO_2$, 15-50%, especially 20-40% $H_2$ and 5-40, especially 10-25% $H_2O$, 100-1000 ppm $H_2S$, the remainder being inert gases and trace components.

The pressures applied in the various steps are associated with the process effectiveness. The first pressure, i.e. the pressure applied at the adsorption step, can be a relatively low pressure, such as 1-5 bar, but it is advantageously in the range of 5-80 bar, most preferably 10-30 bar. The pressure applied at the rinsing step following the adsorption step can advantageously be the same as the first pressure.

The pressure applied in the first purging (desorption) step can be the same as the first (adsorption) pressure, and the rinsing pressure, or a lower pressure. It is preferred however, that the first purging pressure is lower than the adsorption pressure. In particular, the first purging pressure is less than 80% of the first (adsorption) pressure, more preferably less than ⅔ of the first pressure. In a particular effective embodiment the first purging step is performed using a mixture of carbon dioxide and steam at an advantageous absolute pressure between 1 and 64 bar and most preferably between 1 and 24 bar. The partial pressure of $CO_2$ in the first purging step is preferably at least equal to the partial $CO_2$ pressure applied in the adsorption step as described above. Alternatively, the partial pressure is preferably at least 10%, more preferably at least 20%, most preferably at least 30% of the total pressure of the first purging gas.

The pressure applied in the second purging (desorption) step is preferably lower than the pressure applied in the first (adsorption) pressure, and preferably also lower than the pressure of the first purging step. In particular, the first purging pressure is less than 60% of the first (adsorption) pressure, more preferably less than ½ of the first pressure, most preferably between 1 bar and 40% of the first (adsorption) pressure. It is preferred that the second purging pressure is also lower than the first purging pressure, in particular less than %, more preferably less than ½ of the first purging pressure. The desired pressures in a process with varying pressure can be arranged by using pressure equalising systems as well-known per se in the art. In a particular effective embodiment the second purging step is performed using steam at an advantageous absolute pressure between 0 and 16 bar and most preferably between 0 and 12 bar, especially between 0 and 6 bar. Low pressures, e.g. around 1 bar, or even vacuum conditions (close to 0 bar) are also contemplated for the second purging step.

The temperature applied in the process depends on the origin of the feed gas. The adsorption step can be performed at elevated temperatures between e.g. 200 and 600° C., preferably between 300 and 500° C., most preferably between 350 and 500° C. It is advantageous to carry out the rinsing and purging steps at essentially the same temperatures as the adsorption step, which avoids costly cooling and reheating steps used in prior art processes for producing hydrogen-containing or other desired gases with capture of carbon dioxide and other acidic gas species. These temperatures are average bed temperatures. Fluctuations will occur during the adsorption and purging cycles, for example as a result of the heat generated by the interaction of the acidic species with the adsorbent, or by the water gas shift reaction of CO and hydrolysis of COS to $H_2S$.

The purging steps can be carried out co-currently and counter-currently. A counter-current purging is particularly advantageous, especially in the first purging step. Since $H_2S$ adsorption will typically occur in the upstream part of the adsorbent bed, counter-current purging will lead to a more effective and/or quicker or simpler desorption process. Another advantage is a reduced slip of $H_2S$ in the product for counter current operation. In a preferred embodiment, a counter-current purging only purges part of the adsorbent, i.e. the part which is loaded with the first acidic component ($H_2S$) which is the upstream part of the adsorption step. This can be achieved by introducing the purging gas at an intermediate point in the reactor bed or series of reactor beds, for example at between a quarter and three quarters of the length of the reactor (bed), for example halfway. This allows a reduction of the purging time and purging volume and a reduced slip of $H_2S$ into the product gas. A pressure swing mode, i.e. a cycle comprising relatively high-pressure adsorption and relatively low-pressure desorption is also advantageous.

The adsorbent to be used in the process of the invention is preferably an inorganic oxide, which comprises a trivalent metal oxide, in particular alumina or aluminium hydroxide. Instead or in addition to aluminium, other trivalent metal may be present, such as Fe, Mn, Cr. It furthermore comprises one or more alkali metal oxide, hydroxides and/or carbonates. Any alkali metals can be used, including Li, Na K, Rb and Cs. Preferred alkali metals are Na and K. The adsorbent may advantageously further comprise one or more divalent metal oxides, hydroxides or carbonates. The divalent metals can be an alkaline earth metal (Mg, Ca, Sr, Ba) or Co, Ni, Cu, Zn, Cd, Pb. Preferred divalent metals are Mg, Ca, Sr, Ba, Ni and Cu. Preferably, the adsorbent comprises magnesia, and has a molar Mg to Al+Mg ratio of between 0.05 and 0.95, more preferably between 0.1 and 0.8. Where reference is made to alumina, magnesia and the like these include the oxides, but also hydroxides and other equivalents of the oxides of aluminium, magnesium, respectively.

Aluminas also containing alkali metals, possibly in addition to other metals and counterions, are referred to herein as "alkali-promoted aluminas". Aluminas, also containing magnesium and/or other divalent metals, and also containing alkali metals, possibly with other metals and counterions, are referred to herein as "alkali-promoted hydrotalcites". The aluminas may be used in a manner known per se, which may comprise admixing metals oxides and further additives with the alumina or hydrotalcite or other base material in a dry state or in a solution or a slurry, and optionally drying and calcining the resulting mixture. The alumina may be any form of alumina which can be rehydrated, in particular which has a level of hydroxyl groups. Examples include gamma-alumina, boehmite, gibbsite, bayerite.

Inorganic oxides which can be used as an adsorbent can be represented by the following chemical formula:

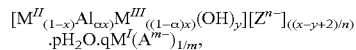

$$[M^{II}_{(1-x)}Al_{\alpha x}M^{III}_{(1-\alpha)x}(OH)_y][Z^{n-}]_{((x-y+2)/n)} \cdot pH_2O \cdot qM^I(A^{m-})_{1/m},$$

wherein:
$M^I$ is one or more metals selected from Li, Na, K, Rb and Cs;
$M^{II}$ is one or more metals selected from Mg, Ca, Sr, Ba, Co, Ni, Cu, Zn, Cd and Pb;
$M^{III}$ is one or more metals selected from Fe, Cr and Mn;
$Z^{n-}$ is one or more anions selected from halide, nitrate or acetate (n=1), or oxide, sulphate, oxalate or carbonate (n=2);
$A^{m-}$ is one or more anions selected from hydroxide (m=1) and the anions as defined for Z above, with m corresponding to n;
m and n=1 or 2 according to A and Z, respectively;
x=0.05-1, preferably 0.05-0.95, more preferably 0.20-0.90;
α=0-1, preferably 0.5-1;
p=0-15;
q=0.1-1, preferably 0.2-0.4;
y=0-4.

Specific examples of hydrotalcites of the above formula are referred to herein as KMG30 having an $MgO:Al_2O_3$ weight ratio of 30:70 and having the formula $[Mg_{0.35}Al_{0.65}(OH)_2][CO_3^{2-}]_{0.325} \cdot 0.5H_2O \cdot 0.32K(CO_3^{2-})_{0.5}$ with a molar ratio K:Mg:Al of about 1.0:1.1:2.0 and a molar ratio of K:(Mg+Al) in the order of 1:3.1 (0.32:1); and as KMG70 having an $MgO:Al_2O_3$ weight ratio of 70:30 and having the formula $[Mg_{0.74}Al_{0.26}(OH)_2][CO_3^{2-}]_{0.13} \cdot 0.5H_2O \cdot 0.27K(CO_3^{2-})_{0.5}$ with a molar ratio K:Mg:Al of about 1.0:2.7:0.9 and a molar ratio of K:(Mg+Al) in the order of 1:3.6 (0.27:1).

The anions in the complex metal oxides are as defined above. Preferably the adsorbent comprises hydroxide and/or carbonate anions in order to ensure sufficient alkalinity for an effective adsorption of acidic gas species. In particular, at least 50% of the anions (expressed in monovalent equivalents) consist of hydroxide and/or carbonate.

Suitable inorganic oxides can have a layered structure, wherein part of the anions is arranged in layers interposed between layers containing the cations. Examples of suitable layered oxides include the hydrotalcites having proportional formula's such as $Mg_6Al_2(CO_3)(OH)_{16} \cdot 4(H_2O)$ or similar combinations with different Mg:Al ratios. Other suitable oxides include analogues wherein magnesium is absent (e.g. scarbroite) or is replaced by calcium (e.g. alumohydrocalcites), strontium (e.g. montroyalite) or barium (e.g. dreserrites), as well as Mg/Fe, Mg/Cr, Mg/Mn, Ni/Al etc. analogues (pyroaurite, stichtite, desautelsite, takovite).

The adsorbent preferably contains an alkali metal compound. Such alkali-containing material are referred to also as 'alkali-promoted'. Thus, the base material of the adsorbent can be an alkali-promoted alumina. The alkali promoters may be in the form of oxides, hydroxides or, preferably carbonates. Especially, the alkali content is ≥5 wt. % calculated as alkali metal, preferably 5-30 wt. %, relative to the final mixed oxide composition.

As described above, the adsorbent material may be further promoted with one or more elements selected from Mg, Mn, Ti, Ag, Cu, Co, Pb, Fe and Cd ("second promoter"). The alumina may be promoted first with the first promoter and thereafter with the second promoter, but in another embodiment, the alumina may also be promoted first with the second promoter and thereafter with the first promoter; in yet another embodiment, the alumina is promoted with the first and second promoter substantially at the same time. Especially, the promoter (second promoter) content is about 5 wt. % or more calculated as oxide, preferable about 5-50 wt. % calculated as oxide, relative to the total weight of the promoted alkali-promoted aluminas. Preferably, Mg, Mn or Fe are used as promoter (i.e. second promoter). Where the adsorbent contains aluminium and magnesium and/or another divalent metal, the Mg:Al ratio, expressed by x in the above formula, is preferably relatively low, i.e. x=0.55-0.90, especially when high pressures (>15 bar) are applied. At low pressures, e.g. below 15 bar, in particular below 10 bar, higher Mg:Al ratios may be useful, e.g. x=0.20-0.55.

The adsorbent may have been thermally treated, i.e. it may have been heated at a temperature above about 200° C., even more especially above about 400° C. For instance, assuming a hydrotalcite, when heating this hydrotalcite in the reactor before the WGS reaction or during the WGS reaction, the hydrotalcite modifies to a promoted alumina, such as $K_2CO_3$ and MgO promoted alumina, since at elevated temperatures, the hydrotalcites may at least partially rearrange in mixed oxides while losing hydrotalcite crystalline structure hydrotalcites and layered double hydroxide. This is well known in the art and is for instance described in U.S. Pat. No. 5,358,701, U.S. Pat. No. 6,322,612 and WO 2005102916. It is to be noted therefore that where reference is made to a hydrotalcite or similar mineral as an adsorbent in the process of the invention, this should be read as an adsorbent based on the hydrotalcite or other mineral, taking into account that the crystalline structure, but not the metal composition, may have changed.

Although the inorganic oxide adsorbent may advantageously be the sole adsorbent-catalyst system within the reactor, the reactor may further contain a (conventional) water gas shift catalyst, wherein preferably the weight ratio of the adsorbent to catalyst is in the range of about 2-50, such as about 5-20, especially about 10-20, or in the range of about 20-100, such as 20-50, especially about 25-50.

The adsorption and subsequent desorption of the acidic gas components, especially when applied as a sorption-enhanced water gas shift (SEWGS) reaction, can be preceded by an additional water-gas shift reaction step, which can be with or without simultaneous carbon dioxide capture. Common WGS catalysts can be used in such a preceding WGS steps, such as high temperature WGS catalysts based on ferric chromium oxides (320-520° C.), or other high temperature or medium temperature WGS catalysts that are sulphur-resistant.

After removal of the acidic gas components, the gas mixture may be used for a Fischer-Tropsch reaction but also for other processes. The reaction mixture, enriched in $H_2$, may thus be provided to a further reactor, which may for instance be a Fischer-Tropsch reactor, or a gas turbine for combustion, or a methanol synthesis reactor, or a CO preferential oxidizer for low-grade $H_2$ production lean in $CO+CO_2$, or a PSA (pressure swing adsorber) system for high grade $H_2$ production, or a methanol production unit, or an ammonia synthesis reactor, etc. Note that the term "remove" here refers to reducing or abating, and does not necessarily imply the complete removal of one or more acid gas components.

The process of the invention may be carried out in a reactor, for example a single bed or multiple bed reactor, comprising a fixed bed containing an adsorbent and optionally a catalyst and further carrier material. The reactor is provided with heating and pressuring devices, and with a plurality of inlet and outlets at either sides of the reactor for feed, purging and product gases, and optionally with side inlets, for partial counter-current regeneration. The reactor and the bed are dimensioned in such a manner that optimum reaction, adsorption and desorption can take place. A reactor to be used in the invention is further illustrated with reference to the figures.

In conclusion, the invention relates to a process for selectively removing at least one of two or more acidic gaseous species from an adsorbent which has been contacted with a feed gas containing at least said first and second gaseous species, comprising:
  a. subjecting the adsorbent to a first purging gas, said first purging gas not containing said first acidic gaseous species and containing said second acidic gaseous species at a partial pressure which is at least the partial pressure of said second gaseous species in said feed gas;
  b. subsequently subjecting the adsorbent to a second purging gas, said second purging gas not containing said first gaseous species and, if containing said second gaseous species, containing this second gaseous species at a partial pressure which is lower than the partial pressure of said second gaseous species in said feed gas.

Herein, the at least one and the first acidic gaseous species is in particular hydrogen sulphide, which is selectively removed and collected. Depending on the desired specifications of the treated feed gas, $CO_2$ may be partly or completely be removed from it to produce a low-$CO_2$ or $CO_2$-free product gas.

Also, the invention relates to such a process for selectively removing $H_2S$ and $CO_2$, comprising:
  a. subjecting the adsorbent to a first purging gas, said first purging gas not containing $H_2S$ and containing $CO_2$ at a partial pressure which is at least the partial pressure of $CO_2$ in said feed gas, in particular containing at least 20 vol. % of $CO_2$;
  b. subsequently subjecting the adsorbent to a second purging gas, said second purging gas not containing $H_2S$, and containing $CO_2$ at a partial pressure which is lower than the partial pressure of $CO_2$ in said feed gas; and in particular containing at least 25 vol. % of water (steam).

The invention furthermore relates to a process for producing a desired gas which is essentially free of a first acidic species, in particular $H_2S$, comprising:
  (i) contacting a feed gas containing $H_2S$ and CO and/or $CO_2$ with an adsorbent capable of adsorbing $CO_2$ and $H_2S$;
  (ii) subjecting the adsorbent to a first purging gas, said first purging gas not containing $H_2S$ and containing CO and/or $CO_2$ at a partial pressure which is at least the partial pressure of CO and/or $CO_2$ in said feed gas;
  (iii) subsequently subjecting the adsorbent to a second purging gas, said second purging gas not containing $H_2S$, and not containing CO and/or $CO_2$.

The process of the invention can result in various desired or product gases, controlled by selecting the appropriate adsorption and regeneration conditions, the product gases including:
  an $H_2S$-free product gas, e.g. mainly containing hydrogen, "$H_2S$-free" being defined as above, i.e. having an upper limit in the ppm range;
  an $H_2S$-free and $CO_2$-depleted or $CO_2$-free ($H_2$) product gas;
  an $H_2S$-free and $CO_2$-depleted $H_2$ and CO-containing gas (syngas);
  an $H_2S$-enriched $CO_2$-containing gas, resulting from the first purge;
  an $H_2S$-free or $H_2S$-depleted $CO_2$-containing gas, resulting from the second purge.

The product gases can contain varying levels of other components such as CO, methane, nitrogen, noble gases, etc. depending on the composition of the feed gas.

DESCRIPTION OF THE DRAWINGS

The accompanying figures are intended to support the description of the invention by way of example only. Herein:

Turning to FIG. 1A, the reactor 1 in this embodiment encloses a single bed 1, which comprises an adsorbent 10 and optionally a catalyst. The term reactor may also relate to a plurality of reactors, which may especially be arranged in parallel. Therefore, also the term "single reactor" may relate to a plurality of reactors arranged in parallel. Also the reactor bed may be a single bed or multiple beds, in parallel or in series. FIG. 1B depicts a series of two beds (see below).

Figure 1A:
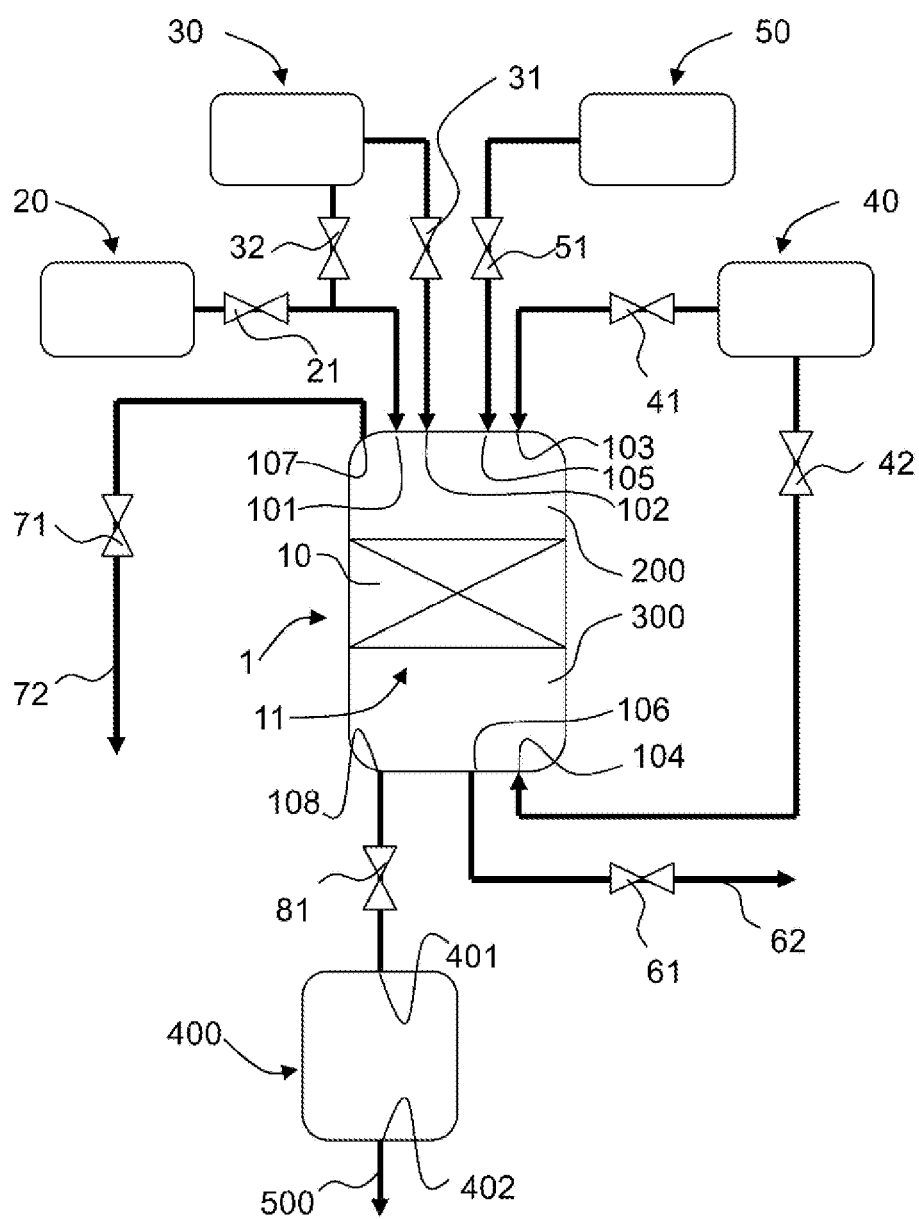
FIGS. 1A and 1B schematically depict an arrangement 2 comprising an embodiment of a reactor 1 for performing the process of the invention, without (1A) or with (1B) side streams.

The process that is performed in the reactor may be the water-gas shift process, and may comprise a reaction stage comprising (a) providing a gas mixture 200 comprising CO, $H_2O$ and an acid gas component to reactor 1 containing adsorbent 10 and (b) subjecting the gas mixture 200 to water gas shift reaction conditions to perform the water gas shift reaction. The adsorbent 10 may comprise an alkali-promoted alumina-based material as described in detail above. The term "metal promoted compound" refers to compounds to which these metals, in any form, are attached and/or included. The metal will in general be present on the compound as oxide and/or as hydroxide. The difference between a mixed bed of a catalyst of a metal oxide and a compound is that such mixed bed may essentially consist of discrete particles (especially granules or extrudates) of the metal oxide and of the compound (respectively), whereas when a promoted compound is used in a (single) bed, the bed will essentially consist of particles (especially granules or extrudates) which comprise an intimate mixture of the compound and its promoter(s).

The gas mixture comprising the starting components CO and $H_2O$ (for the WGSR) and the acid gas components such as $H_2S$, COS, $CS_2$, HCN, $NO_x$, $SO_x$, HCl, or oxygen or water, is introduced to the reactor 1 via one or more inlets. In an embodiment, a feed gas mixture originates from a first supply 20, for instance from a coal gasifier, an oil gasifier, a petcoke gasifier, a natural gas reformer, from biomass gasification, etc. can be introduced to a first inlet 101 to the reactor 1, while the feeding is controlled with valve 21. The gas mixture 200 before a reaction and before adsorption in the reactor 1 has a composition, which can be predetermined, and which composition is also indicated as "inlet composition". The complete gas mixture 200 may be introduced via one supply line into reactor 1. However, one or more of the components may also be introduced to a gas mixture comprising at least CO and $H_2S$ before entering the reactor, such as in the example above wherein $H_2O$ is introduced in the gas mixture from other supply lines (not shown).

The reaction and/or adsorption performed in reactor bed 11 results in a desired gas mixture, such as a water gas shifted reaction mixture, indicated with reference 300. The reaction mixture 300, enriched in $H_2$, may be provided to a further reactor, here indicated as second reactor 400, which may for instance be a Fischer-Tropsch reactor or a methane production unit or a gas turbine for combustion or a methanol synthesis reactor, or a CO preferential oxidizer for low-grade $H_2$ production lean in CO+$CO_2$, or a PSA (pressure swing adsorber) system for high grade $H_2$ production, or an ammonia synthesis reactor, etc. Products thereof, indicated with reference 500, may be released from the second reactor 400 via outlet 402. Reference 108 indicates an opening or outlet in the reactor 1, arranged to be in gaseous communication with the optional second reactor 400. A valve 81 may be present in the gas channel between the reactor 1 and the optional second reactor 400. Optional second reactor 400 may have an opening or inlet 401, arranged to be in gaseous contact (via the gas channel) with the reactor 1.

An advantage of the invention may also be that the downstream reactors for $H_2$ production may be smaller (such as a methanator, preferential oxidation (PrOx), PSA) and/or that the $H_2$ purity can be increased because the present invention already removes significant amounts of impurities ($CO_2$, $H_2S$, etc).

After the reaction stage (i.e. the WGS stage), a regeneration stage is applied. Regeneration may be applied by pressure-swing and/or thermal swing, processes known in the art. Pressure-swing herein also comprises partial pressure swing, i.e. the partial pressure of a gas component is controlled. Prior to the regeneration stage, a rinsing gas is fed through the reactor. The rinsing gas may be provided from a second supply 30 and is fed to the reactor between the adsorption and the regeneration stage, either via the same supply line or via a separate supply line, such that is introduced at a second inlet 102 in the reactor 1. The supply of the rinsing gas may be controlled by valves 31 or 32. The rinsing gas may consist of or contain $CO_2$ and optionally contain other gases such as nitrogen, methane, steam etc, as described above. The spent rising gas may leave the reactor though outlet 106, valve 61 to a recipient 62. The rinsing gas may also be introduced in a counter-current mode; inlet 102 is then provided at the other end of the reactor (not shown) and the spent rinsing gas leaves the reactor through outlet 107, valve 71 to a recipient 72.

During the regeneration stage a first purging gas is supplied. The first purging gas, e.g. containing $CO_2$, may be provided from a purging gas supply 40. When using a co-current regeneration mode, the purging gas is introduced to the reactor at the same end as the feed gas, i.e. through valve 41 and inlet 103. The spent (loaded) purging gas leaves the reactor through outlet 106, through valve 61 to recipient 62. Alternatively, and advantageously, when using a counter-current regeneration mode, the purging gas is introduced to the reactor at the other end, i.e. through valve 42 and inlet 104 and leaves thought outlet 107, valve 71 and recipient 72. The second purging gas, for example containing steam, can likewise be provided from a second purging gas supply 50, through valve 51, inlet 105. As with the first purging gas, it can alternatively be supplied in a counter-current mode, and then the line is at the other end of the reactor (not shown). The recipients 62 and 72 can be multiple recipient for separately collecting spent rising gas, loaded first purging gas and loaded second purging gas. Valve 61 and 62 may be three-way valves or four-way valves as appropriate. The spent rinsing and purging gases can then be further process or used.

The regeneration stage is preferably performed at a temperature in the range of about 200-600° C., preferably in a range of about 300-500° C. The reaction stage and regeneration stage may be performed in a cyclic way, wherein the reaction stage is followed by one or more regeneration stages. Outlets 106 and 108 or 107 and 108 may also be connected to a parallel reactor (see above) for e.g., pressure equalisation.

Figure 1B:
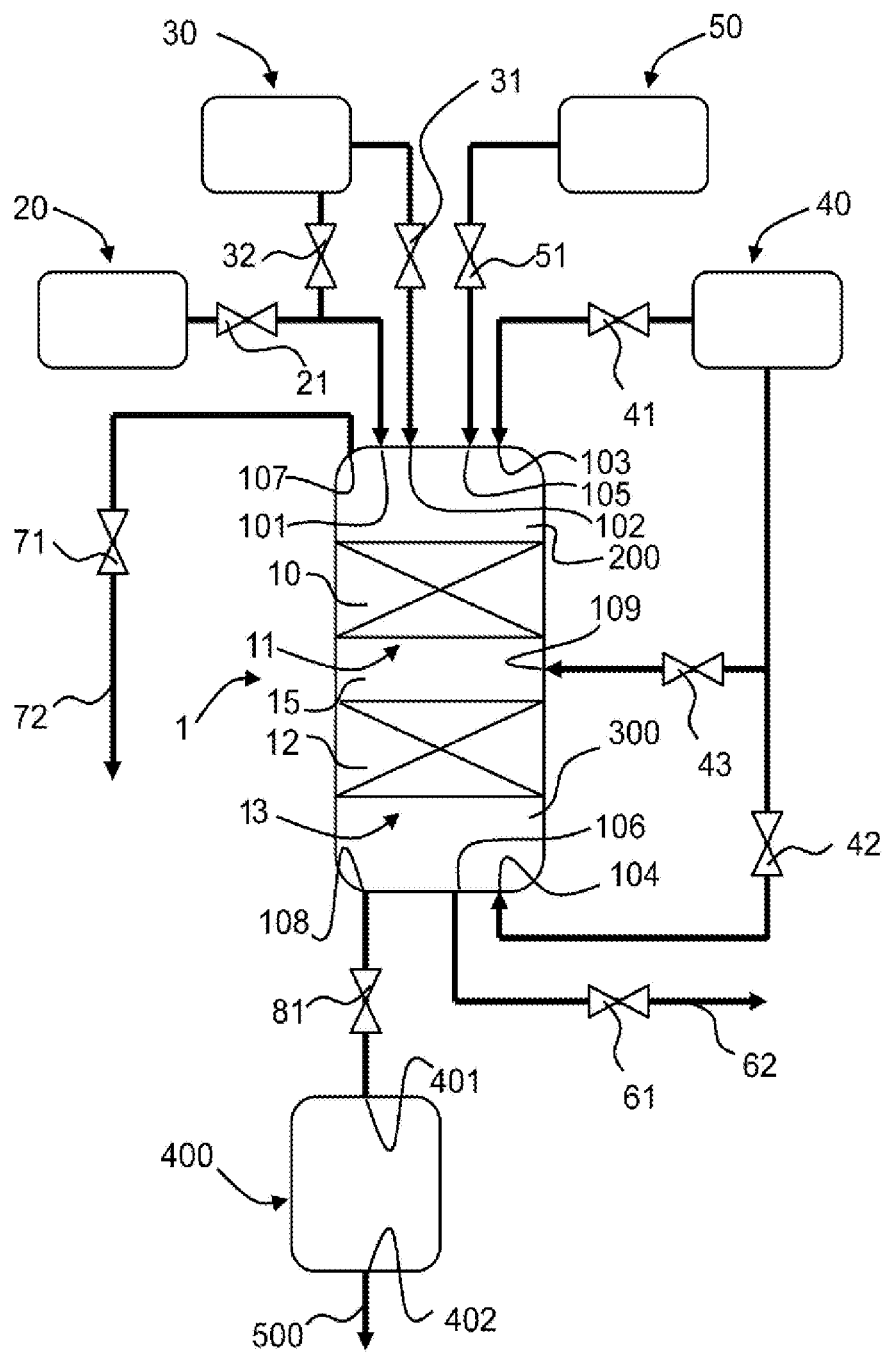

FIG. 1B illustrates the same reactor system as in FIG. 1A, with the exception that the reactor bed is split into a first bed 11 containing adsorbent 10 and a second bed 13 containing adsorbent 12, with a space 15 in between. Instead of, or in addition to the counter-current supply of purging gas through valve 42 and inlet 104, a purging gas supply is provided between the two reactor beds through valve 43 and inlet 109 into space 15. Upon regeneration, only the upstream bed 11 is purged by the purging gas, since $H_2S$ will mainly or exclusively be adsorbed by adsorbent 10 in bed 11 and not by adsorbent 12 in bed 13. The further parts can be the same as in FIG. 1A.

EXAMPLE 1

Figure 2:
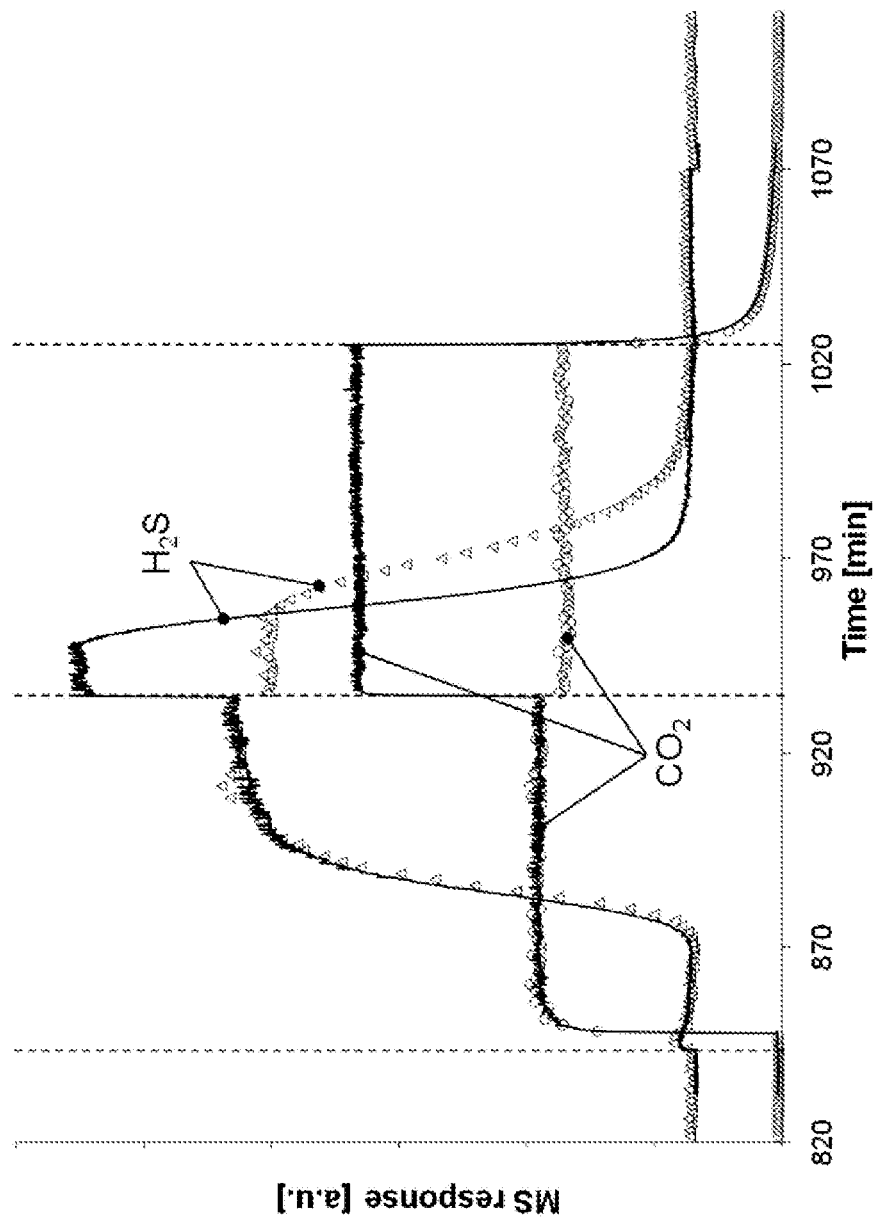
FIG. 2 shows the results of adsorption and co-current regeneration at 1 bar and 400° C., and of the same adsorption and regeneration, but with a different $CO_2$ level in the first regeneration step.

A gas mixture having the composition as given in Table 3 below was subjected to adsorption in a reactor bed as schematically depicted in FIG. 1, containing K-promoted hydrotalcite (KMG30: Mg:Al ratio of about 1:2), and subsequently regenerated with two different purging gases having the compositions as given in the table, in co-current operation, at 1 bar and 400° C. The results are shown in FIG. 2 (symbols).

TABLE 3

Gas compositions of feed gas and purging gases.

| | feed gas | purging gas 1 (vol. %) | | purging gas 2 |
|---|---|---|---|---|
| | (vol. %) | Example 1 | Example 2 | (vol. %) |
| $H_2S$ | 0.05 | 0 | 0 | 0 |
| $H_2O$ | 17.1 | 17.1 | 17.1 | 17.1 |
| $CO_2$ | 10.7 | 10.7 | 21.4 | 0 |
| $N_2$ | 32.1 | 0 | 0 | 42.9 |
| He | 40.0 | 40.0 | 40.0 | 40.0 |
| Ar | 0 | 32.2 | 21.5 | 0 |

EXAMPLE 2

The experiment of Example 1 was repeated by using a higher $CO_2$ content in the first purging gas. The gas mixture having the composition as given in Table 3 was subjected to adsorption in a reactor bed containing K-promoted hydrotalcite, and subsequently regenerated with two different purging gases having the compositions as given in the table, in co-current operation, at 1 bar and 400° C.

The results are shown in FIG. 2 (continuous lines). The figure shows that an increased $CO_2$ content in the first purge results in a faster desorption of $H_2S$.

EXAMPLE 3

A gas mixture having the composition as given in Table 4 below was subjected to adsorption in a reactor bed as schematically depicted in FIG. 1, containing K-promoted hydrotalcite (KGM30: Mg:Al ratio of about 1:2), and subsequently regenerated with two different purging gases having the compositions as given in Table 4, in counter-current Pressure Swing Adsorption (PSA) operation at 400° C. Feeding and regeneration (purging) step 1 were performed at different pressures (3-25 bar) and regeneration (purging) step 2 was performed at 1 bar.

Figure 3:
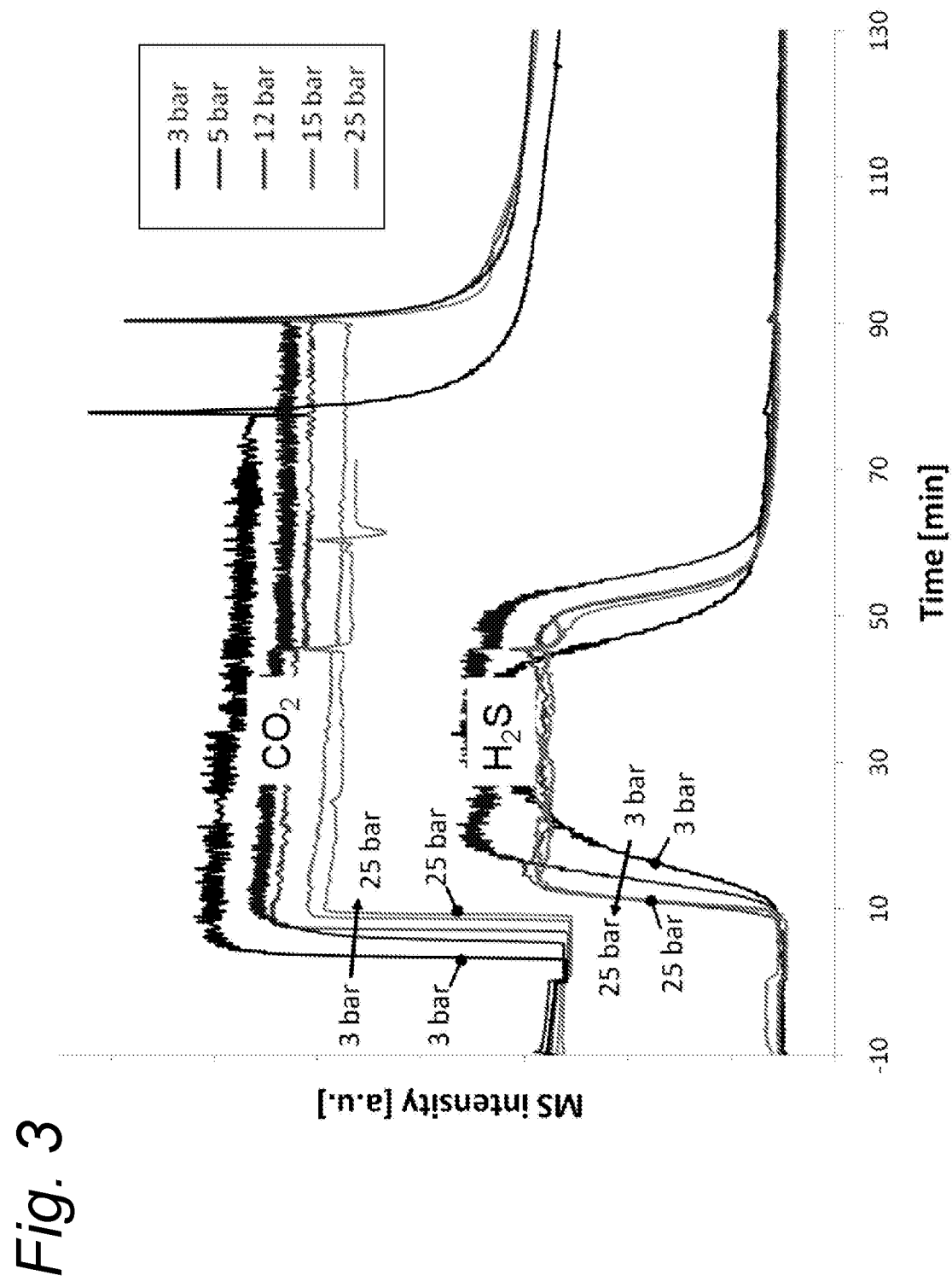
FIG. 3 shows the results of adsorption and counter-current regeneration at 400° C. in PSA mode according to the invention, using a $CO_2$-containing first purging gas.

The results are shown in FIG. 3. It follows that at low pressures, up to about 15 bar, the breakthrough front for $CO_2$ is separated in time from $H_2S$ breakthrough, meaning that there is a period in which both $H_2S$ and $CO_2$ are adsorbed and a period where only $H_2S$ is adsorbed and $CO_2$ is not. In the regeneration (purging) step 1 there is effective and separate cleaning of $H_2S$ and $CO_2$ at all pressures.

TABLE 4

Gas compositions of feed gas and purging gases.

| | feed gas (vol. %) | purging gas 1 (vol. %) | | purging gas 2 (vol. %) |
|---|---|---|---|---|
| | | Example 3 | Comparative Example | |
| $H_2S$ | 0.02 | 0 | 0 | 0 |
| $H_2O$ | 30 | 30 | 30 | 75 |
| $CO_2$ | 25 | 25 | 0 | 0 |
| $N_2$ | 5 | 45 | 70 | 25 |

COMPARATIVE EXAMPLE

Example 3 was repeated, with the exception that the first purging gas did not contain $CO_2$. A gas mixture having the composition as given in Table 2 was treated in the same way as in Example 3, but for the composition of the first purging gas. Feeding and regeneration (purging) step 1 were performed at different pressures (2-30 bar) and regeneration (purging) step 2 was performed at 1 bar.

Figure 4:
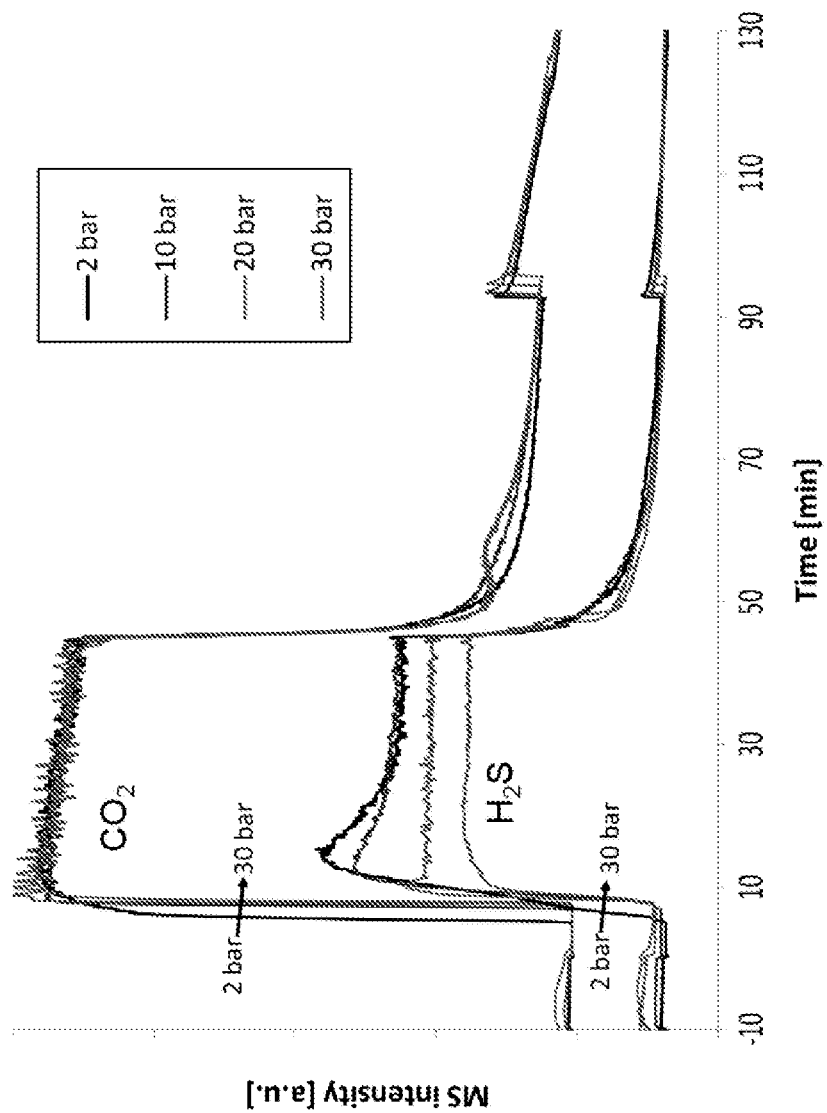
FIG. 4 shows the results of the same adsorption and regeneration as FIG. 4, but using a first purging gas not containing $CO_2$.

The results are shown in FIG. 4. It follows that at all pressures, there is no effective desorption in step 1, and hence $H_2S$ and $CO_2$ cannot be effectively separated. Although a period can be identified where both $H_2S$ and $CO_2$ are adsorbed, no period is identified where only $H_2S$ is adsorbed.

The invention claimed is:

1. A process for selectively removing a first and second acidic gaseous species from an adsorbent which has been contacted with a feed gas comprising at least the first and second gaseous species, the process comprising:
    (a) subjecting the adsorbent to a first purging gas, the first purging gas not comprising the first acidic gaseous species and comprising the second acidic gaseous species at a partial pressure which is at least the partial pressure of the second gaseous species in the feed gas;
    (b) subsequently subjecting the adsorbent to a second purging gas, the second purging gas not comprising the first gaseous species and, if comprising the second gaseous species, comprising the second gaseous species at a partial pressure which is lower than the partial pressure of the second gaseous species in the feed gas.

2. The process according to claim 1, wherein the first acidic gaseous species comprises hydrogen sulphide and the second acidic gaseous species comprises carbon dioxide.

3. The process according to claim 1, wherein the first purging gas comprises carbon dioxide.

4. The process according to claim 1, wherein the second purging gas comprises a member selected from steam, nitrogen, methane and noble gases, and preferably comprises steam.

5. The process according to claim 1, further comprising, prior to step (a), the step of rinsing the adsorbent with a rinsing gas, the rinsing gas not comprising the first acidic gaseous species and comprising the second acidic gaseous species at a partial pressure which is lower than the partial pressure of the second gaseous species in the feed gas.

6. The process according to claim 5, wherein the rinsing gas comprises steam and/or nitrogen.

7. The process according to claim 1, wherein the adsorbent comprises alumina and one or more alkali metal oxides, hydroxides or carbonates.

8. The process according to claim 7, wherein the adsorbent further comprises one or more divalent metal oxides, hydroxides or carbonates.

9. The process according to claim 7, wherein the adsorbent is based on a hydrotalcite.

10. The process according to claim 8, wherein the adsorbent comprises magnesia and has a molar ratio of Mg to (Al+Mg) of between 0.05 and 0.95.

11. The process according to claim 10, wherein the molar ratio of Mg to (Al+Mg) is between 0.1 and 0.8.

12. The process according to claim 1, wherein step (a) is performed at a pressure which is less than ⅔ of the pressure of the step wherein the feed gas has been contacted with the adsorbent, and/or wherein step (b) is performed at a pressure which is less than ½ of the pressure of the step wherein the feed gas has been contacted with the adsorbent.

13. The process according to claim 1, wherein step (a) is performed in countercurrent with respect to the contacting of the adsorbent with the feed gas.

14. The process according to claim 13, wherein in step (a) only an upstream part of the adsorbent is subjected to the first purging gas.

15. A process for producing a desired gas, comprising:
(a) reacting a feed gas to produce the desired gas and two or more gaseous acidic species, wherein the feed gas is reacted in the presence of an adsorbent capable of adsorbing two or more of the acidic gaseous species, and, subsequently,
(b) removing the two or more acidic gaseous species from the adsorbent by the process according to claim 1.

16. The process according to claim 15, wherein the desired gas comprises hydrogen at a concentration higher than the hydrogen concentration of the feed gas.

17. The process according to claim 16, wherein the desired gas is produced by a sorption-enhanced water gas shift (SEWGS) process.

18. The process according to claim 17, wherein the reaction in the presence of an adsorbent is performed at a pressure in the range of 7-40 bar.

19. A process for producing a desired gas which is essentially free of $H_2S$, comprising the steps of:
(a) contacting a feed gas comprising $H_2S$ and CO and/or $CO_2$ with an adsorbent capable of adsorbing $CO_2$ and $H_2S$;
(b) subjecting the adsorbent to a first purging gas, the first purging gas not comprising $H_2S$ and comprising CO and/or $CO_2$ at a partial pressure which is at least the partial pressure of CO and/or $CO_2$ in the feed gas; and
(c) subsequently subjecting the adsorbent to a second purging gas, the second purging gas not comprising $H_2S$, and not comprising CO and/or $CO_2$.

20. The process according to claim 19, wherein the desired gas comprises CO and/or $CO_2$.

* * * * *